2,854,450

ANTIBIOTIC COMPOUNDS

Lee C. Cheney, Fayetteville, N. Y., assignor to Bristol Laboratories Inc., Syracuse, N. Y., a corporation of New York No Drawing. Application August 30, 1956
Serial No. 606,963

6 Claims. (Cl. 260—239.1)

This invention relates to new antibiotic compounds and their salts and, more particularly, to novel substituted parabenzyl-phenoxymethylpenicillins.

This application is a continuation-in-part of my prior, co-pending application S. N. 552,251, filed December 12, 1955, now abandoned.

In the past, the most useful penicillin (penicillin G) has been assigned the formula

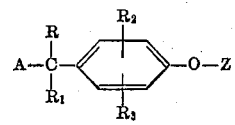

where R is benzyl, and the name benzylpenicillin. Benzylpenicillin, although very useful, has suffered from the disadvantage of being unstable in water, particularly in aqueous acid. It has also been found to be inefficient, particularly on oral administration, in the sense that much of the dosage given in therapy does not appear in the blood stream in active form, i. e. some has been decomposed and is no longer antibacterially effective. The metal and substituted ammonium salts of benzylpenicillin have the same disadvantages, especially as their solubility in water increases. Such solubility in water is often to be desired, however, to facilitate adsorption from the intestinal canal, or release from a site of injection, into the blood stream.

The object of the present invention was to overcome these disadvantages of benzylpenicillin and to produce new penicillins which are stable in the presence of water and particularly of aqueous acid as well as being non-toxic and therapeutically effective. A further object of the present invention was to provide various useful salts of such new penicillins and processes for their preparation.

The objects of the present invention have been attained and there is now provided, according to the present invention, a new group of penicillins having, in their acid form, the formula

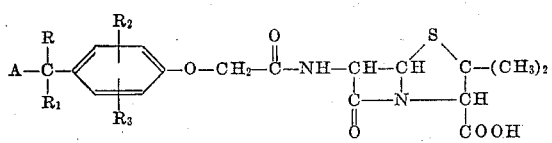

where A represents phenyl, thienyl, furyl, pyrrolyl, pyridyl, pyrimidyl, thiazolyl and naphthyl and such aromatic radicals bearing one or two substituents such as (lower) alkyl (e. g. methyl), (lower) alkoxy (e. g. methoxy), halogen or nitro; R represents hydrogen, benzyl, phenyl, (lower) alkyl or (lower) cycloalkyl; $R_1$ represents hydrogen, (lower) alkyl, chloro, bromo, iodo, (lower) alkoxyl, hydroxyl, amino, hydroxy (lower) alkyl and (lower) cycloalkyl; and $R_2$ and $R_3$ represent hydrogen, (lower) alkyl, (lower) alkoxy, fluoro, chloro, bromo, iodo, hydroxy, nitro, amino, (lower) alkylamino and di(lower) alkylamino, included in the present invention are the non-toxic salts of these penicillins, that is, non-toxic metallic salts such as sodium, potassium, calcium and aluminum, the ammonium salts and substituted ammonium salts, e. g. salts of such non-toxic amines as procaine, dibenzylamine, N-benzyl-beta-phenethylamine, 1-ephenamine, N,N'-dibenzylethylenediamine, dehydroabietylamine, N,N'-bis-dehydroabietylethylenediamine, and other amines which have been used to form salts with benzylpenicillin.

There is further provided according to the present invention the method of producing a new penicillin in submerged culture which comprises growing a Penicillium mold of the notatumchrysogenum group in a culture medium in the presence of an effective amount less than about five percent of a precursor having the formula

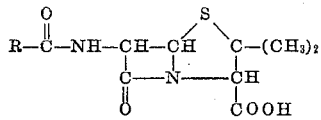

wherein A represents a member selected from the group consisting of phenyl, tolyl, (lower) alkoxyphenyl, halophenyl, nitrophenyl, thienyl, substituted thienyl, furyl, substituted furyl, pyrrolyl, substituted pyrrolyl, pyridyl, substituted pyridyl, pyrimidyl, substituted pyrimidyl, thiazolyl, substituted thiazolyl, naphthyl and substituted naphthyl; R is a member selected from the group consisting of hydrogen, benzyl, phenyl, (lower) alkyl and (lower) cycloalkyl; $R_1$ is a member selected from the group consisting of hydrogen, (lower) alkyl, chloro, bromo, iodo, (lower) alkoxyl, hydroxyl, amino, hydroxy (lower) alkyl and (lower) cycloalkyl; and $R_2$ and $R_3$ are members selected from the group consisting of hydrogen, (lower) alkyl, (lower) alkoxy, chloro, bromo, iodo, hydroxy, nitro, amino, (lower) alkylamino and (lower) dialkylamino; and Z represents a radical selected from the group consisting —$CH_2COOH$, —$CH_2COOM$ where M represents a metal which does not inhibit the fermentation, —$CH_2CH_2NH_2$, —$CH_2CONH$—$CH_2CH_2OH$, —$CH_2CONH_2$, —$CH_2CHO$, —$CH_2CH_2OH$, and radicals which are transformed into the equivalent of the —$CH_2COOH$ radical during the course of the fermentation and isolating the new penicillin so produced. Equivalents of these substituted acetic acids thus include simple derivatives such as salts, esters, amides and anhydrides.

Examples of these precursors are: 4-benzylphenoxyacetic acid, 2-(4-benzylphenoxy)-N-(2-hydroxyethyl)-acetamide, 2-(4-benzylphenoxy)-ethanol, 2-diethylamino-ethyl-α-phenyl-p-toloxyacetate dihydrogen citrate dihydrate, 2-(α-phenyl-p-toloxy)-N-(2-diethylaminoethyl)-acetamide dihydrogen citrate monohydrate, 1-(α-phenyl-p-toloxy)-2-propanol, 4-benzylphenoxyethylamine, 4-benzylphenoxy - acetylglycine, 4 - benzylphenoxyacetyl-alanine, 4-benzyl-phenoxyacetylaspartic acid, 4-benzyl-phenoxyacetylglutamic acid, 4-benzyl-phenoxyacethydrazide.

The culture of the medium containing the new precursor and the isolation of the new penicillin is conducted according to the methods known to the art, e. g. U. S. Patents 2,562,410 and 2,440,359. The amount of precursor to be used varies widely. The maximum concentration is about five percent and the minimum is that necessary to produce a reasonable amount of the new pencillin. The precursor is ordinarily used in a concentration of about 0.01 to 1.0 percent and preferably about 0.05 to 0.5 percent.

The precursors used in the present invention, when they are not known compounds, may be prepared, for example, by heating ethyl chloroacetate with the sodio derivative of the appropriate phenol, e. g. p-benzylphenol. Subsequent addition of aqueous caustic to the crude ester, followed by heating and final acidification, converts the ester to the substituted phenoxyacetic acid. Thus 4-benzylphenoxyacetic acid, M. P. 121–122° C., was prepared according to Mazzara, Gazz., 11, 437 (Beilstein, 6, 676), 4(α,α-dimethylbenzyl)-phenoxyacetic acid, M. P. 117° C., according to Welsh and Drake, J. Am. Chem. Soc., 60, 59 (1938), and 4-(α-phenylethyl)-phenoxyacetic acid, M. P. 100° C., according to Frisch, J. Org. Chem., 15, 587 (1952).

The following examples will serve to illustrate this invention without limiting it thereto.

EXAMPLE I p-Benzyl phenoxy methyl penicillin

A medium consisting of 4% lactose, 4% corn steep liquor, 1% cottonseed meal, 1% $CaCO_3$, 0.75% lard oil and an amount of a single precursor as indicated below was autoclaved (20 minutes at 15 pounds per square inch), inoculated with a strain of *Penicillium chrysogenum* and fermented for seven days at 74° F. on a rotary shaker at 220 R. P. M. using 100 ml. of liquid in a 500 ml. Erlenmeyer flask. When desired for isolation or analysis, samples were removed, centrifuged; the supernatant liquid was then filtered and the filtrate was assayed and analyzed by paper-strip chromatography.

In each case, samples of this filtrate were also treated with acid (adjusted to pH 2 by the addition of hydrochloric acid, allowed to stand for 24 hours and then neutralized) before analysis to remove such acid-unstable penicillins as benzylpenicillin. The descending paper chromatography was conducted using S. and S. Blue Ribbon paper with 40% aqueous sodium citrate as the solvent and using samples of broth removed after five days fermentation. The results are tabulated below.

| Broth No. | Acid Treated | $R_f$ Values of Zones of Inhibition | Bioassay after 7 days in Oxford Units/ml. |
|---|---|---|---|
| Precursor: 0.1% 4-benzylphenoxyacetic acid | | | |
| 11 | No | 0–0.16   0.24–0.35   0.54–0.64 | 200 |
| 11 | Yes | 0–0.1 | 150 |
| Precursor: 0.1% 2-benzylphenoxyacetic acid | | | |
| 15 | No | 0.19–0.38   0.4–0.65 | 200 |
| 15 | Yes | No zones observed | N. R. |
| Precursor: 0.1% phenoxyacetic acid | | | |
| 20 | No | 0.29–0.42 | 1,010 |
| 20 | Yes | 0.26–0.39 | 540 |
| Precursor: 0.1% N-(2-hydroxyethyl)-2-phenoxyacetamide | | | |
| 4 | No | 0.23–0.35 | 1,210 |
| 4 | Yes | 0.24–0.44 | 150 |
| Precursor: 0.5% phenylacetic acid | | | |
| 23 | No | 0.4–0.52 | 1,715 |
| 23 | Yes | 0.44–0.51 | N. R. |

N. R. means "no reading," i. e. no inhibition.

Thus, the novel penicillin, 4-benzylphenoxymethylpenicillin was prepared in broth 11, shown to be biologically active and acid stable, freed of contaminants by acid treatment, characterized by its $R_f$ value of zero to about 0.15 and differentiated from all other penicillins, particularly G and V.

EXAMPLE II p-Benzylphenoxymethylpenicillin

The procedure of Example I was repeated with the medium changed to 6% lactose, 3% soy bean meal, 0.1% $Na_2SO_4$, 0.4% $CaCO_3$, 0.75% lard oil and precursor. The results were as follows:

| Broth No. | Acid Treated | $R_f$ Values of Zones of Inhibition | Bioassay after 7 days in Oxford Units/ml. |
|---|---|---|---|
| Precursor: 0.1% 4-benzylphenoxyacetic acid | | | |
| 36 | No | 0.01–0.15   0.22–0.35   0.39–0.6 | 200 |
| 36 | Yes | 0.0–0.13 | 150 |
| Precursor: 0.1% 2-benzylphenoxyacetic acid | | | |
| 40 | No | 0.18–0.37   0.39–0.47–0.62 | 520 |
| 40 | Yes | No zones | N. R. |
| Precursor: 0.1% phenoxyacetic acid | | | |
| 44 | No | 0.23–0.38 | 2,703 |
| 44 | Yes | 0.29–0.38 | 225 |
| 0.1% N-(2-hydroxyethyl) 2-phenoxyacetamide | | | |
| 28 | No | 0.22–0.38   0.49–0.53 | 1,825 |
| 28 | Yes | 0.24–0.38 | 250 |
| 0.5% phenylacetic acid | | | |
| 47 | No | 0.4–0.54 | 2,870 |
| 47 | Yes | No zones | N. R. |

N. R. means "no reading," i. e., no inhibition.

Thus, the novel penicillin, 4-benzylphenoxymethylpenicillin was prepared in broth 36, shown to be biologically active and acid stable, freed of contaminants by acid treatment, characterized by its $R_f$ value of zero to about 0.15 and differentiated from all other penicillins, particularly G and V.

EXAMPLE III p-Benzylphenoxymethylpenicillin

Filtered broths obtained according to the procedures of Examples I and II containing a range in total activity from 500–1200 O. U./ml. with 30–60 O. U./ml. acid stable activity were extracted with ½ volume of methyl isobutyl ketone at pH 2.0. The ketonic extract was extracted with ⅕ volume of pH 8 potassium phosphate buffer. From the methyl isobutyl ketone-buffer emulsion a precipitate of the potassium salt of p-benzylphenoxyacetic acid was removed by filtration. The buffer solution was extracted with ½ volume of butanol and the butanol extract was treated with 10% activated charcoal (weight/total activity basis). The carbon treated butanol solution was then concentrated 20-fold or until crystals appeared. It was found that, if the concentrate was filtered soon after the first crystals of the potassium salt of p-benzylphenoxymethylpenicillin appeared, a higher potency product was obtained. Further concentrations of the mother liquor then produced a second crop of less pure product. In this manner, first crops assaying as high as 1200 O. U./mg. total activity and 880 O. U./mg. acid stable activity were produced. Acid stable activity denotes that remaining after storage at pH 1.5–2.0 in aqueous solution at 5° C. for 24 hours. The yield of acid stable activity from filtered broth to crude crystals was about 50%.

Paper chromatograms of the crude crystals still showed several zones. It was found that recrystallization from butanol was a very effective technique for the purification of the potassium salt of p-benzylphenoxymethyl-penicillin. A 1-gm. sample was dissolved in 200 ml. wet butanol and treated with 0.1 gm. of carbon. The butanol was then concentrated until crystals appeared. The first crop was collected by filtration and the second crop obtained by further concentrating the mother liquor. For high potency solids only one recrystallization was necessary but for more impure solids as many as three were required. Recrystallizations were made until the product gave only one zone on paper chromatograms and total and acid stable assays were constant.

The pure potassium salt of p-benzylphenoxymethyl-penicillin had a melting point of 222–225° C. (with decomposition) and assayed vs. B. subtilis 1250 O. U./mg. total activity and 900 O. U./mg. acid stable activity.

Analysis gave C, 57.5%; H, 4.95%; N, 5.61% and K (as $K_2SO_4$), 17.7%. Calculated for the potassium salt of p-benzylphenoxymethylpenicillin: C, 57.8%; H, 4.65%; N, 5.06%; K, 18.2%.

The infrared spectrum (1% in solid KBr) exhibits bands at 2.98, 5.6–5.75, 5.96, 6.24 and 6.68 microns. The ultraviolet spectrum shows λmax. 269 and 275 mμ and λmin. 252 and 270.5 mμ. The spectrum of the precursor p-benzylphenoxyacetic acid, exhibits λmax. 269 and 275 mμ and λmin. 251 and 270 mμ.

Degradation of p-benzylphenoxymethylpenicillin with strong alkali gave p-benzylphenoxyacetic acid.

EXAMPLE IV

*4-benzyl-2-chlorophenoxymethylpenicillin*

Acid stable, biologically active 4-benzyl-2-chlorophenoxymethyl-penicillin is prepared by following the procedures of Examples I and II, adding as precursor 0.1% 4-benzyl-2-chlorophenoxyacetic acid at the start of the fermentation and an additional 0.1% on each of the second, third and fourth days.

EXAMPLE V

*4-(α,α-dimethylbenzyl)-phenoxymethylpenicillin*

Following the procedure of Example I, the precursor therein is replaced by 0.1% 4-(α,α-dimethylbenzyl)-phenoxyacetic acid to produce antibacterially active, acid-stable 4-(α,α-dimethylbenzyl)-phenoxymethylpenicillin.

EXAMPLE VI

*4-(α-phenylethyl)-phenoxymethylpenicillin*

In the procedure of Example I, 0.1% 4-(α-phenylethyl)-phenoxyacetic acid is used as the precursor to produce antibiotically active, acid stable 4-(α-phenylethyl)-phenoxymethylpenicillin.

EXAMPLE VII

*4-benzhydrylphenoxymethylpenicillin*

By proceeding according to Example II, using 0.1% 4-benzhydrylphenoxyacetic acid as precursor, there is formed acid-stable, antibacterially active 4-benzhydryl-phenoxymethylpenicillin.

EXAMPLE VIII

*4-(2-thenyl)-phenoxymethylpenicillin*

Acid-stable, antibacterially active 4-(2-thenyl)-phenoxymethylpenicillin is formed according to the procedure of Example II using 0.1% 4-(2-thenyl)-phenoxyacetic acid as precursor.

The following acid-stable, antibacterially active compounds are prepared by using 0.05 to 0.5 percent of the appropriate substituted phenoxyacetic acid as precursor in fermentations carried out according to Examples I and II:

4-(p-chlorobenzyl)-phenoxymethylpenicillin,
4-(o-chlorobenzyl)-phenoxymethylpenicillin,
4-(p-methoxybenzyl)-phenoxymethylpenicillin,
4-(o-methoxybenzyl)-phenoxymethylpenicillin,
4-(p-methylbenzyl)-phenoxymethylpenicillin,
4-(o-methylbenzyl)-phenoxymethylpenicillin,
4-(p-bromobenzyl)-phenoxymethylpenicillin,
4-(o-bromobenzyl)-phenoxymethylpenicillin,
4-(α-benzylbenzyl)-phenoxymethylpenicillin,
4-(α-chlorobenzyl)-phenoxymethylpenicillin,
4-(α-hydroxybenzyl)-phenoxymethylpenicillin,
4-(α-methoxybenzyl)-phenoxymethylpenicillin,
4-(α-aminobenzyl)-phenoxymethylpenicillin,
4-benzyl-2-bromo-phenoxymethylpenicillin,
4-benzyl-2-iodo-phenoxymethylpenicillin,
4-benzyl-2-fluoro-phenoxymethylpenicillin,
4-benzyl-2-nitro-phenoxymethylpenicillin,
4-benzyl-2-hydroxy-phenoxymethylpenicillin,
4-benzyl-2-methoxy-phenoxymethylpenicillin,
4-benzyl-2-amino-phenoxymethylpenicillin,
4-benzyl-2-methylamino - phenoxymethylpenicillin, and
4-benzyl-2-dimethylamino-phenoxymethylpenicillin.

The novel penicillins of the present invention fall in the chemical category of acids and are easily converted to salts by reaction with a base. Thus treatment of the penicillin in solution in water with sodium hydroxide converts it to the sodium salt. Similarly an amine salt, e. g. procaine, is prepared by reacting a solution of the penicillin in aqueous or non-aqueous solvent with a similar solution of procaine base. The salt so formed is then isolated by lyophilization or, if the product is insoluble, by filtration. The free penicillins of the present invention are similarly isolated from aqueous, acidified broth by the usual procedures of multiple extractions and concentrations or by lyophilization; preferably the starting broth or an intermediate solution is first subjected to acid conditions, e. g. as described above, to destroy any benzylpenicillin present as an impurity.

I claim:
1. p-Benzylphenoxymethylpenicillin.
2. α-Methyl-p-benzylphenoxymethylpenicillin.
3. p-(α-Thenyl)-phenoxymethylpenicillin.
4. α,α-Dimethyl-p-benzylphenoxymethylpenicillin.
5. p-Benzyl-ortho-chlorophenoxymethylpenicillin.
6. A new penicillin selected from the group consisting of acids having the formula

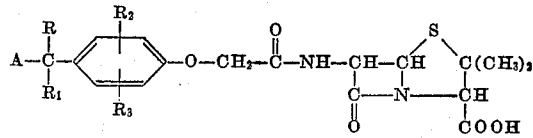

wherein A represents a member selected from the group consisting of phenyl and thenyl; R is a member selected from the group consisting of hydrogen, phenyl and (lower) alkyl; $R_1$ is a member selected from the group consisting of hydrogen and (lower) alkyl; $R_2$ is hydrogen and $R_3$ is a member selected from the group consisting of hydrogen and chloro; and their sodium, potassium, calcium, aluminum and ammonium salts and non-toxic substituted ammonium salts with an amine selected from the group consisting of procaine, dibenzylamine, N-benzyl-beta-phenethylamine, 1-ephenamine, N,N'-dibenzyl-ethylenediamine, dehydroabietylamine and N,N'-bis-dehydroabietylethylenediamine.

References Cited in the file of this patent

UNITED STATES PATENTS 2,479,295    Behrens  ---------------- Aug. 16, 1949
2,562,410    Behrens et al. ---------- July 31, 1951

OTHER REFERENCES

Brandl et al.: Österr. Chem. Ztg., vol. 55, pages 11–12 (1954).